No. 624,248. Patented May 2, 1899.
T. C. PROUTY.
BALL BEARING WHEEL.
(Application filed July 10, 1896. Renewed Nov. 30, 1898.)
(No Model.)
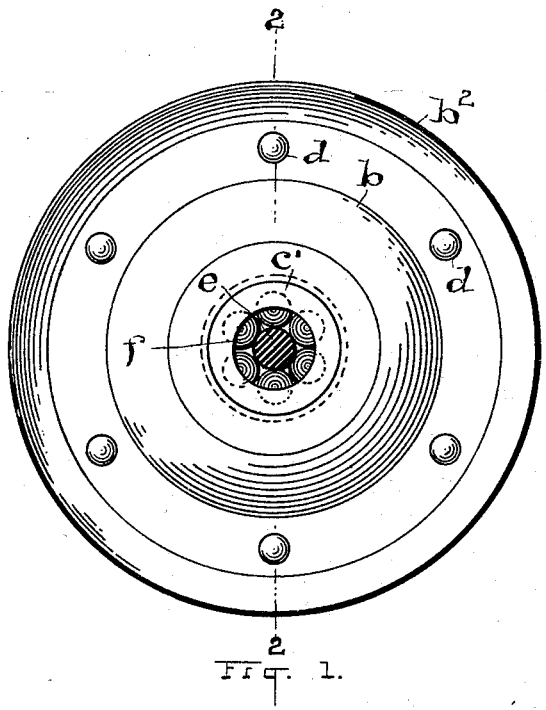
Fig. 1.
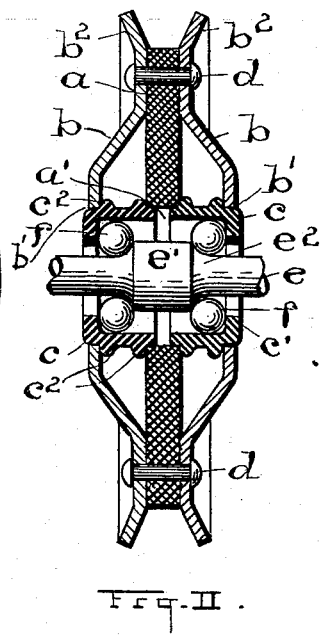
Fig. II.
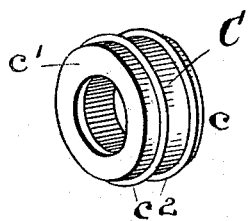
Fig. III.
WITNESSES
O. Emerkel
David J. Davies
INVENTOR
T. C. Prouty
By Hall & Fay
ATTYS.
THE NORRIS PETERS CO., PHOTO-LITHO., WASHINGTON, D. C.

UNITED STATES PATENT OFFICE.

THEODORE C. PROUTY, OF MIDLAND, MICHIGAN.

BALL-BEARING WHEEL.

SPECIFICATION forming part of Letters Patent No. 624,248, dated May 2, 1899.

Application filed July 10, 1896. Renewed November 30, 1898. Serial No. 697,923. (No model.)

*To all whom it may concern:*

Be it known that I, THEODORE C. PROUTY, a citizen of the United States, and a resident of Midland, county of Midland, and State of Michigan, have invented certain new and useful Improvements in Ball-Bearing Wheels, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a front elevation of my improved ball-bearing wheel; Fig. II, a cross-sectional view on the line 2 2, Fig. I; and Fig. III, a perspective view of one of the ball-cups.

The body portion of the wheel consists of the central circular tread-disk $a$, the outer shells $b$, and the ball-cups $c$. The disk $a$ and shells $b$ are pierced centrally by the circular openings $a'$ and $b'$, which admit the cups $c$. The circular shells $b$, of greater diameter than disk $a$, are stamped or drawn so as to form a centrally-depressed portion around the openings $b'$, and their outer edges are bent outwardly to form the tread-guards $b^2$. Rivets $d$ serve to fasten the shells to the disk $a$.

The ball-race cups $c$ are each formed with an annular flange $c'$ and extend through the shells $b$ and into the opening $a'$ of the disk $a$. Circumferential ribs $c^2$ abut the inner faces of the shells and the outer faces of the central disk, as shown, and prevent any lateral displacement of the said cups.

The shaft $e$ is formed with a centrally-enlarged portion $e'$, and the shoulders $e^2$ are turned to form ball-cones. The distance between said shoulders is such that the balls $f$ can be interposed between said shoulders and the angles formed by the barrel of the ball-race cups and the flanges $c'$, so as to form a properly-running ball-bearing.

In order to make my improved wheel as noiseless in its operation as possible, I prefer to use pressed fiber for the construction of the tread-disk $a$.

Other modes of applying the principle of my invention may be employed instead of the one explained, change being made as regards the mechanism herein disclosed, provided the means covered by any one of the following claims be employed.

I therefore particularly point out and distinctly claim as my invention—

1. A wheel consisting of a circular disk adapted to form the tread of the wheel, two shells, ball-cups, a suitable shaft, balls and suitable cones, said disk and shells formed with central openings adapted to receive said cups, said cups provided with circumferential ribs adapted to engage the said disk and shells, whereby relative lateral movement of said disk and shells and said cups is prevented, substantially as set forth.

2. In a ball-bearing wheel, the combination of a body portion consisting of a tread-disk, two shells attached to said disk, said shells and disk formed with central openings, ball-cups in said openings, said cups each provided with circumferential ribs, one of said ribs adapted to abut the tread-disk and one adapted to abut the inside of one of the shells, whereby relative lateral movement of said disk and shells and said cups is prevented; balls and suitable cones, substantially as set forth.

3. In a ball-bearing wheel, the combination of a body portion consisting of a tread-disk, two shells attached to said disk, said shells and disk formed with central openings, two ball-cups in said openings, said cups each provided with two circumferential ribs, one of said ribs adapted to abut the tread-disk and the other adapted to abut the inside of one of the shells, said shells formed to project beyond the tread-disk to form tread-guards; balls and suitable cones, substantially as set forth.

4. In a ball-bearing wheel, the combination of a body portion consisting of a tread-disk, two shells attached to said disk, said shells and disk formed with central openings, ball-cups within said openings, said cups each formed with a flange at its outer portion adapted to form one portion of a ball-raceway, said shells formed with a depressed portion whereby annular spaces are formed between said tread-disk and shells, said cups provided with ribs adapted to be interposed between said disk and each shell, whereby relative lateral movement of said disk and shells and said cups is prevented; suitable cones and balls, substantially as set forth.

In testimony that I claim the foregoing to be my invention I have hereunto set my hand this 6th day of July, A. D. 1896.

THEODORE C. PROUTY.

Witnesses:
M. P. ANDERSON,
M. ANDERSON.